United States Patent [19]

Hildebrand et al.

[11] Patent Number: 4,656,880
[45] Date of Patent: Apr. 14, 1987

[54] CONTROL-MOTION TRANSMISSION ASSEMBLY FOR AIR CONTROL SYSTEM OF AUTOMOTIVE VEHICLE

[75] Inventors: Reinhard Hildebrand, Redwitz; Bernd Waldmann, Kronach, both of Fed. Rep. of Germany

[73] Assignee: Siemens Aktiengesellschaft, Berlin and Munich, Fed. Rep. of Germany

[21] Appl. No.: 777,596

[22] Filed: Sep. 19, 1985

[30] Foreign Application Priority Data

Oct. 23, 1984 [DE] Fed. Rep. of Germany ....... 3438833

[51] Int. Cl.⁴ .............................................. F16L 1/10
[52] U.S. Cl. .................................. 74/105; 74/501 R; 74/502
[58] Field of Search ................. 74/501 R, 501 A, 502, 74/99 R

[56] References Cited

U.S. PATENT DOCUMENTS

| | | | |
|---|---|---|---|
| 2,933,942 | 4/1960 | Boylan et al. | 74/501 A |
| 3,342,081 | 9/1967 | Conrad | 74/501 A |
| 4,428,251 | 1/1984 | Last | 74/501 R |

FOREIGN PATENT DOCUMENTS

| | | |
|---|---|---|
| 1655102 | 6/1971 | Fed. Rep. of Germany . |
| 2852452 | 6/1980 | Fed. Rep. of Germany . |
| 3206288 | 9/1983 | Fed. Rep. of Germany . |
| 1207158 | 9/1970 | United Kingdom . |

*Primary Examiner*—Albert J. Makay
*Assistant Examiner*—David W. Westphal
*Attorney, Agent, or Firm*—Kenyon & Kenyon

[57] ABSTRACT

A control-motion transmission assembly in the heating, ventilating and air conditioning system of an automotive vehicle comprises a housing, an actuator lever slidably mounted to the housing, and a secondary or setting lever pivotably fastened at one end to an inner end of the actuator lever. Another end of the setting lever is linked to a guide pin and to one end of a Bowden cable wire. The guide pin is guided in a slot in the housing, while an end of the Bowden wire opposite the setting lever is connected to an operating mechanism of the heating, ventilating and air conditioning system. The Bowden cable has a sheath pivotably fastened to the housing.

10 Claims, 3 Drawing Figures

CONTROL-MOTION TRANSMISSION ASSEMBLY FOR AIR CONTROL SYSTEM OF AUTOMOTIVE VEHICLE

BACKGROUND OF THE INVENTION

This invention relates to a control unit for the air control system of an automotive vehicle. More particularly, this invention relates to a control-motion transmission assembly incorporated in the heating, ventilating and air conditioning system of an automotive vehicle.

Such a control unit is typically located at the dashboard in the passenger compartment of the vehicle. The control unit has a plastic housing and includes at least one manually movable actuator lever and a setting lever for transmitting the control motion from the actuator lever to an operating mechanism such as an air damper or an electrical resistor of the heating, ventilating and air conditioning (HVAC) system.

As set forth in British Patent No. 1,207,158, a particular control unit of this type includes a Bowden cable which aids in transmitting the control motion to the operating mechanism of the HVAC system. A lever device is provided for the forced transmission of the control or setting motion from the actuator lever to the point of attachment of the Bowden cable. This lever device includes a first component rotatable about a fixed axis and a second component connected to the first component via a slidable and tiltable coupling. The Bowden cable is fastened to one of the two components, the actuator lever being attached to the other of the components. A disadvantage of this sort of transmission assembly is that the operating forces are either nonuniform over the stroke of the actuator lever, whereby an easy setting motion of the actuator lever is impossible, or the transition between the actuator lever and the lever device is based on the principle of a linear guide, which results in increased wear.

In accordance with another design of a transmission assembly of the above-described type, a setting lever is mounted between guide surfaces extending in a setting direction. This design is very elaborate and consists of many parts.

In accordance with yet another design, a pivotably mounted intermediate lever is disposed between an actuator lever and a setting lever, whereby circular motion of the setting lever and linear or slightly curved motion of the actuator lever are combined. A perfectly parallel guide of the actuator lever along a guide track is thereby produced. In an extended or stretched-out position of the intermediate lever, a self-latching of the transmission assembly can be achieved.

An object of the present invention is to provide an improved control-motion transmission assembly of the above-described type.

Another, more particular, object of the present invention is to provide such an assembly in which the ease with which the actuator lever is moved is substantially uniform along the path of motion of the lever.

Another particular feature of the present invention is to provide such an assembly which exhibits a self-latching function in at least one end position of the actuator lever.

SUMMARY OF THE INVENTION

In accordance with the present invention, a transmission assembly in an air control system of an automotive vehicle for transmitting a control motion to an operating mechanism of the air control system comprises a housing provided with a guide slot, a manually movable actuator lever movably mounted to the housing, and a setting lever pivotably connected at a first point to the actuator lever. A guide pin is attached to the setting lever at a second point spaced from the first point, the guide pin projecting into the guide slot. The transmission assembly further comprises a Bowden cable having a sheath connected at one end to the housing and a wire slidably disposed within the sheath and connected at one end to the setting lever.

In accordance with the present invention, there is no intermediate lever in the control-motion transmission assembly and the setting lever is not supported along a fixed axis. The path and orientation of the setting lever varies depending on the position of the actuator lever along its motion path.

In accordance with particular features of the present invention, the one end of the sheath is pivotably connected to the housing via a Bowden cable clip and the guide slot is integrated into the housing.

Pursuant to a further particular feature of the present invention, the shape of the guide slot is designed to vary the extent to which the motion of the actuator lever affects the operating mechanism of the HVAC system. Accordingly, the guide slot may have two portions wherein the same displacement of the actuator lever produces different amounts of adjustment of the HVAC operating mechanism. A displacement of the actuator lever along a path corresponding to a first portion of the guide slot may produce an increase (or decrease) in the current flowing through a heating resistor or in the angle of a ventilator flap which is twice the increase (or decrease) produced when the actuator lever is displaced the same amount along a path corresponding to a second portion of the guide slot. In a particular embodiment of the invention, the actuator lever is slidably mounted to the housing for motion along a straight path, the guide slot having a first portion extending substantially perpendicularly to the motion path of the actuator lever and a second portion extending substantially parallel to the path.

A control-motion transmission assembly in accordance with the invention has a smaller number of parts than conventional assemblies. The use of a smaller number of parts simplifies assembly procedures and therefore lowers assembly costs.

Self-latching of a control-motion transmission assembly in accordance with the present invention can be achieved at at least one end position of the actuator lever. The self-latching is produced by matching or adjustment of the Bowden cable and the setting lever, of the setting lever and the actuator lever, and/or of the guide slot and the actuator lever. Pursuant to the invention, the angle subtended between the wire of the Bowden cable and the setting lever has a value between 8° and 90°, the angle subtended between the setting lever and the actuator lever has a value between 10° and 45°, and an angle subtended between the guide slot and the actuator lever has a value between 0° and 45°.

DETAILED DESCRIPTION

Figure 1:
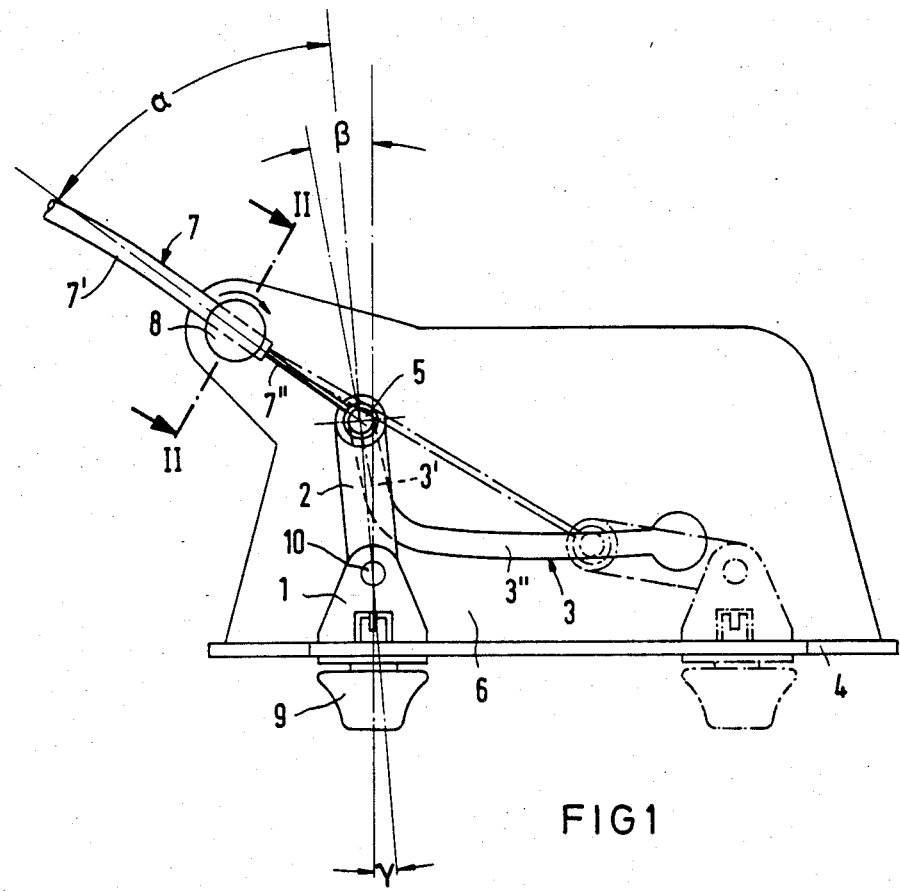
FIG. 1 is a partially schematic top view of a control-motion transmission assembly in accordance with the present invention, showing a Bowden cable, an actuator lever and a housing.

As illustrated in FIG. 1, a control-motion transmission assembly disposed at the control panel of an automotive vehicle comprises a base body or housing 6 made of a plastic material such as acrylnitril-butadiene-styrene copolymers (ABS), fiberglass-reinforced (PA 6-GV) polyphenylene oxide (PPO), polyoxymethylene (POM) or fiberglass-reinforced polypropylene (PP-GV). Housing 6 is formed with a guide track 4 at which a manually shiftable actuator lever 1 is slidably mounted for motion along a straight path parallel to, and defined by, the guide track. Actuator lever is provided at an outer end, i.e., at an end projecting into the passenger compartment of an automotive vehicle (not illustrated), with an actuator knob 9.

A secondary or setting lever 2 is rotatably attached by a pivot pin 10 to an inner end of actuator lever 1, i.e., to an end of actuator lever opposite actuator knob 9 and disposed on a side of a control panel opposite the passenger compartment of the automotive vehicle. At a free end, i.e., at an end opposite pivot pin 10, setting lever 2 is provided with a guide pin 5 having a portion projecting into and disposed within a guide slot 3 formed in housing 6.

Figure 2:
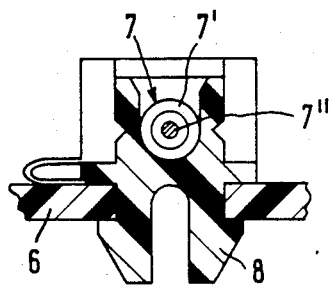
FIG. 2 is a partial cross-sectional view taken along line II—II in FIG. 1, showing the attachment of the Bowden cable to the housing.

A Bowden cable has a sheath 7' rotatably fastened at one end to housing 6 by means of a Bowden cable clip 8 illustrated in detail in FIG. 2. Clip 8 securely grips cable sheath 7' and is swivelably mounted to housing 6.

Bowden cable includes a wire 7" slidably disposed within sheath 7' and attached at one end to setting lever 2 indirectly via guide pin 5 or directly in the region of guide pin 5. An end of wire 7" opposite guide pin 5 and setting lever 2 is linked to an operating mechanism or component of the heating, ventilating and air conditioning (HVAC) system of an automotive vehicle. This operating mechanism may be, for example, a ventilation flap (not illustrated) defining an opening with a size which varies in response to a control motion transmitted from the actuator lever 1 over setting lever 2 and Bowden cable 7. Alternatively, the operating mechanism may be a device (not illustrated) for adjusting the amount of current flowing through a heating resistor of the HVAC system.

Figure 3:
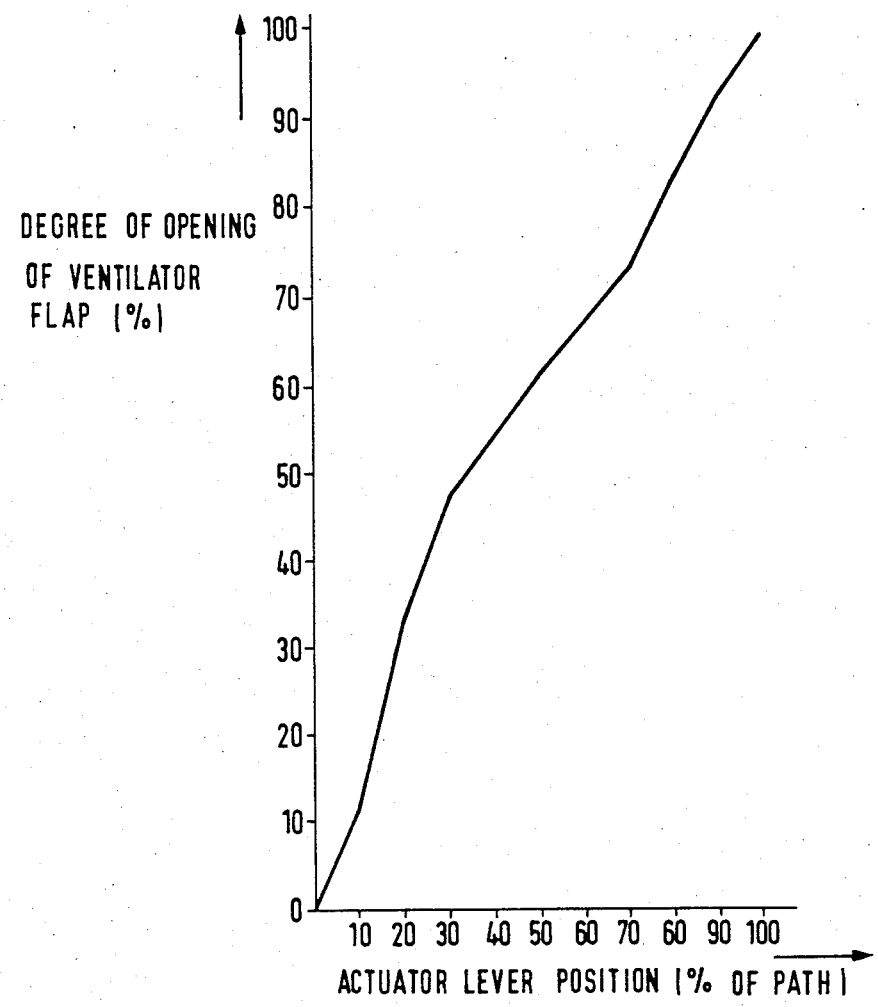
FIG. 3 is a graph showing the degree of opening of an air-flow control flap as a function of the position of the actuator lever of FIG. 1 along a motion path.

Generally, guide slot 3 has a shape designed to vary the extent to which the motion of actuator lever 1 affects the operating mechanism of the HVAC system. Accordingly, in the event that the operating mechanism connected to actuator lever 1 via setting lever 2 and Bowden cable 7 is a ventilation flap, the amount that the flap is opened by a predetermined displacement of actuator lever 1 depends on the position of that lever along its motion path when the displacement occurs. As illustrated in FIG. 3, the rate at which the ventilator flap is opened (or closed) by a sliding of actuator lever 1 may have several distinct values, depending on the instantaneous location of actuator lever 1 along its controlmotion path.

As illustrated in FIG. 1, guide slot 3 has a first portion 3' extending substantially perpendicularly to the motion path of actuator lever 1 and a second portion 3" extending substantially parallel to the path. The guide slot may be provided with additional segments and the angles of inclination among the segments may be varied to change the effect of the control motion of actuator 1 upon the degree of adjustment of the particular operating mechanism. The separate portions of the guide slot need not be straight. Some or all of them may have arcuate shapes.

In addition to the shape of guide slot 3, other structural features of the transmission assembly, such as the shape of setting lever 2 and the points of attachment thereto of pin 10 and Bowden cable wire 7", may be designed to control the effect of actuator motion on changes in the operating mechanism of the HVAC system.

Self-latching of the control-motion transmission assembly can be achieved at at least one end position of actuator lever 1. The self-latching is achieved by matching or adjustment of Bowden cable wire 7' and setting lever 2, of setting lever 2 and actuator lever 1, and/or of guide slot 3 and actuator lever 1. An angle subtended between wire 7" of Bowden cable 7 and setting lever 2 has a value between 8° and 90°, while an angle $\gamma$ subtended between setting lever 2 at a self-latching end position of the actuator lever and actuator lever 1 at a self-latching end position has a value between 10° and 45° and an angle $\beta$ subtended between guide slot 3 and actuator lever 1 at that end position has a value between 0° and 45°.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the descriptions and illustrations herein are proferred by way of example to facilitate comprehension of the invention and should not be construed to limit the scope thereof.

What is claimed is:

1. A transmission assembly in an air control system of an automotive vehicle for transmitting a control motion to an operating mechanism of the air control system, comprising:

a housing provided with a guide slot;

a manually movable actuator lever translatably mounted to said housing, said actuator lever having an end projecting from said housing and adapted to be grasped by an operator;

a setting lever pivotably connected at a first point to said actuator lever, said setting lever overlapping said actuator lever in a region about said point;

a guide pin attached to said setting lever at a second point spaced from said first point, said guide pin projecting into said guide slot, said guide pin being positionally fixed with respect to said setting lever; and a Bowden cable having a sheath connected at one end to said housing and a wire slidably disposed within said sheath and connected at one end to said setting lever.

2. The assembly defined in claim 1 wherein said one end of said sheath is pivotally connected to said housing.

3. The assembly defined in claim 2, further comprising a Bowden cable clip fastened to said housing and coupled to said sheath for rotatably supporting said sheath at said one end of said sheath.

4. The assembly defined in claim 1 wherein said guide slot is integrated into said housing.

5. The assembly defined in claim 1 wherein said one end of said wire is connected to said setting lever at said guide pin.

6. The assembly defined in claim 1 wherein said guide slot has a plurality of portions extending at an angle with respect to one another.

7. The assembly defined in claim 6 wherein said actuator lever is slidably mounted to said housing for motion along a straight path, said guide slot having a first portion extending substantially perpendicularly to said path and a second portion extending substantially parallel to said path.

8. The assembly in claim 7 wherein a first angle is subtended between said wire and said setting lever at one end position of said actuator lever, said first angle having a value between 8° and 90°, a second angle being subtended between said setting lever and said actuator lever at said one end position, said second angle having a value between 10° and 45°, a third angle being subtended between said guide slot sand said actuator lever at said one end position, said third angle having a value between 0°0 and 45°.

9. The assembly defined in claim 1 wherein a first angle is subtended between said wire and said setting lever at one end position of said actuator lever, said first angle having a value between 8° and 90°, a second angle being subtended between said setting lever and said actuator lever at said one end position, said second angle having a value between 10° and 45°, a third angle being subtended between said guide slot and said actuator lever at said one end position, said third angle having a velue between 0° and 45°.

10. The assembly defined in claim 1 wherein said guide slot is formed with portions extending at different angles with respect to each another.

* * * * *